(12) United States Patent
Yoon et al.

(10) Patent No.: US 12,467,873 B2
(45) Date of Patent: Nov. 11, 2025

(54) ELECTRIFIED COMPONENT HAIRPIN INSPECTION DEVICE

(71) Applicant: VIEWON CO., LTD., Seoul (KR)

(72) Inventors: Young Wook Yoon, Gyeonggi-do (KR); Young Yeop Yoon, Gyeonggi-do (KR)

(73) Assignee: VIEWON CO., LTD., Seoul (KR)

( * ) Notice: Subject to any disclaimer, the term of this patent is extended or adjusted under 35 U.S.C. 154(b) by 0 days.

(21) Appl. No.: 18/693,896

(22) PCT Filed: Dec. 19, 2022

(86) PCT No.: PCT/KR2022/020698
§ 371 (c)(1),
(2) Date: Mar. 20, 2024

(87) PCT Pub. No.: WO2023/121170
PCT Pub. Date: Jun. 29, 2023

(65) Prior Publication Data
US 2024/0385120 A1    Nov. 21, 2024

(30) Foreign Application Priority Data
Dec. 23, 2021   (KR) ..................... 10-2021-0186600

(51) Int. Cl.
*G01N 21/88* (2006.01)
*H04N 23/71* (2023.01)
*H04N 23/74* (2023.01)

(52) U.S. Cl.
CPC ......... *G01N 21/8806* (2013.01); *H04N 23/71* (2023.01); *H04N 23/74* (2023.01)

(58) Field of Classification Search
CPC ..... G01N 21/8806; H04N 23/74; H04N 23/71

USPC .......................................................... 348/92
See application file for complete search history.

(56) References Cited

U.S. PATENT DOCUMENTS

| | | | | |
|---|---|---|---|---|
| 2015/0085136 A1* | 3/2015 | Bernal | ................... | H04N 23/71 |
| | | | | 348/335 |
| 2021/0031297 A1* | 2/2021 | Wang | ..................... | B23K 31/02 |
| 2021/0288563 A1* | 9/2021 | Lee | ......................... | H02K 15/02 |

FOREIGN PATENT DOCUMENTS

| | | |
|---|---|---|
| JP | 2019-190868 A | 10/2019 |
| JP | 2020-156253 A | 9/2020 |
| KR | 10-2009-0120383 A | 11/2009 |
| KR | 10-2012-0031677 A | 4/2012 |
| KR | 10-2020-0058736 A | 5/2020 |

(Continued)

OTHER PUBLICATIONS

KIPO, Application No. PCT/KR2022/020698, International Search Report and Written Opinion dated Mar. 24, 2023.

(Continued)

*Primary Examiner* — Allen C Wong
(74) *Attorney, Agent, or Firm* — Fitch, Even, Tabin & Flannery LLP (57) ABSTRACT

A hairpin inspection apparatus for inspecting a hairpin included in an electrification component includes an electrification block seated on a rotating device and rotated by the rotating device, a hairpin mounted on an electrification block, and a lighting unit provided on the hairpin to irradiate light to the electrification block and the hairpin, in which the lighting unit includes a light source generating light and a lens collecting the light generated from the light source.

9 Claims, 8 Drawing Sheets

(56) References Cited

FOREIGN PATENT DOCUMENTS

| | | |
|---|---|---|
| KR | 10-2280560 B1 | 7/2021 |
| KR | 10-2322361 B1 | 11/2021 |
| KR | 10-2421126 B1 | 7/2022 |

OTHER PUBLICATIONS

KIPO; Application No. 10-2021-0186600; Request for the Submission of an Opinion dated Mar. 10, 2022.
KIPO; Application No. 10-2021-0186600; Written Decision on Registration dated May 11, 2022.

* cited by examiner

ELECTRIFIED COMPONENT HAIRPIN INSPECTION DEVICE

CROSS-REFERENCE TO RELATED APPLICATIONS

This application is a U.S. national phase application filed under 35 U.S.C. § 371 of International Application PCT/KR2022/020698, filed Dec. 19, 2022 which is based upon and claims the benefit of priority from the prior Korean Application No. 10-2021-0186600, filed Dec. 23, 2021.

FIELD

The present disclosure relates to a hairpin inspection apparatus for an electrification component, and more particularly, to a hair inspection apparatus for an electrification component, in which light is irradiated to a hairpin of the electrification component through a lighting unit including a condensing lens in front of a light source, thereby increasing light efficiency while improving uniformity of light.

BACKGROUND

Due to the recent rapid increase in demand for electric vehicles, the demand for electrified components is increasing, and accordingly, inspection of parts in the mass production system of electrification components is actively underway. Electrification components generally include rotating bodies, and thus inspection devices suitable for inspecting rotating bodies are being developed.

Meanwhile, an electrification component may include a hairpin in the circumferential direction of the electrification component. To inspect a hairpin included in an electrification component, a brightness difference between an electrification block (a stator) having the hairpin mounted thereon and the hairpin may be used.

More specifically, or by reducing light incident after reflected from the hairpin and increasing light incident after reflected from the electrification block, the shape, position, etc., of the hairpin may be inspected through the brightness difference between the hairpin and the electrification block.

Figure 1:
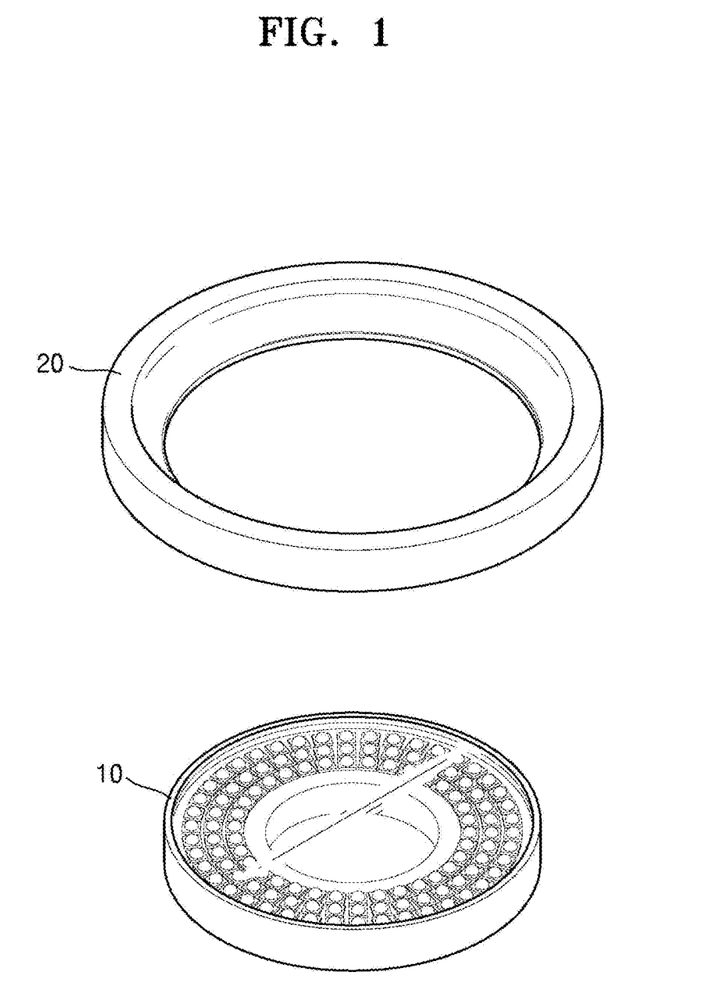
FIG. 1 illustrates a conventional lighting module.

To irradiate light to the hairpin and electrification block, a lighting module may be used. FIG. 1 illustrates a conventional lighting module. Referring to the conventional lighting module, the conventional lighting module irradiates light using a rectangular or circular light-emitting diode (LED) 10 and a diffuser 20.

However, the conventional lighting module has problems such as the following. Light generated in the LED 10 is emitted through the diffuser 20 and irradiated to the hairpin and the electrification block. However, the lighting module using the LED 10 and the diffuser 20 in this way may have difficulty in securing the amount of light, due to light-diffusing characteristics thereof, despite improving light uniformity.

Moreover, it may be difficult for the lighting module using the LED 10 and the diffuser 20 to perform inspection by using the brightness difference between the hairpin and the electrification block, due to the light-diffusing characteristics thereof.

SUMMARY

The present disclosure provides a hair inspection apparatus for an electrification component in which light is irradiated to a hairpin of the electrification component through a lighting unit including a condensing lens in front of a light source, thereby increasing light efficiency while improving uniformity of light.

A hairpin inspection apparatus for inspecting a hairpin included in an electrification component includes an electrification block seated on a rotating device and rotated by the rotating device, a hairpin mounted on an electrification block, and a lighting unit provided on the hairpin to irradiate light to the electrification block and the hairpin, in which the lighting unit includes a light source generating light and a lens collecting the light generated from the light source.

A slope may be formed at an end of the hairpin of the hairpin inspection apparatus. The lighting unit of the hairpin inspection apparatus may be provided in plurality, and a plurality of the lighting units may be configured to irradiate light to the electrification block and the hairpin in different directions.

The hairpin inspection apparatus may further include an angle adjusting unit configured to adjust directions of the lighting units and a controller configured to control the directions of the lighting units by controlling the angle adjusting unit.

The controller of the hairpin inspection apparatus may be further configured to analyze illuminance distribution when light is irradiated through the lighting units and when two or more bright parts are detected in the illuminance distribution, control the lighting units while reducing a distance between the plurality of lighting units or reducing an angle between the plurality of lighting units, such that there is one bright part in the illuminance distribution.

The controller of the hairpin inspection apparatus may be further configured to analyze illuminance distribution when light is irradiated through the lighting units and when a bright part is convex in the illuminance distribution, control the lighting units while increasing the distance between the plurality of lighting units or increasing the angle between the plurality of lighting units, such that the bright part is flat in the illuminance distribution.

The hairpin inspection apparatus may further include a photographing unit provided on the hairpin to photograph the hairpin and the electrification block, in which the photographing unit is arranged on an extending line of a center line of the electrification block.

The hairpin of the hairpin inspection apparatus may be arranged between center lines along which light is irradiated from the plurality of lighting units.

The plurality of hairpins of the hairpin inspection apparatus may be mounted on the electrification block, and an angle at which the light is irradiated from the lighting unit to the hairpin may be less than arctan (a distance D between hairpins/a length L of a hairpin).

The present disclosure relates to a hairpin inspection apparatus for an electrification component in which light is irradiated to a hairpin of the electrification component through a lighting unit including a condensing lens in front of a light source, thereby increasing light efficiency while improving uniformity of light.

Moreover, a brightness difference between the hairpin and the electrification block may be induced by condensing the light through the lighting unit including the condensing lens in front of the light source, and a track time may be reduced by increasing the amount of light through the lighting unit including the condensing lens.

Furthermore, the sufficient amount of light may be secured without increasing the number of light-emitting diodes (LEDs) by increasing light efficiency through the lighting unit including the condensing lens in front of the light source, thereby reducing the number of LEDs and thus saving a cost.

In addition, by radiating light to the hairpin of the electrification component and the electrification block through the lighting unit including the condensing lens in front of the light source and disposing the hairpin between center lines along which light is irradiated from a plurality of lighting units, light incident after reflected the hairpin may be reduced and light incident after reflected from the electrification block may be increased.

MODE FOR INVENTION

Hereinafter, various embodiments of the present disclosure will be described in relation to the accompanying drawings. Various embodiments of the present disclosure may be modified and have various embodiments, and specific embodiments are illustrated in the drawings and a related detailed description is provided. However, this is not intended to limit the various embodiments of the present disclosure to specific embodiments, and should be understood to include all changes and/or equivalents or substitutes included in the spirit and technical scope of the various embodiments of the present disclosure. In connection with the description of the drawings, similar reference numbers have been used for similar components.

The term "include", "may include", or the like used in various embodiments of the present disclosure is to indicate the presence of functions, operations, elements, etc., disclosed therein, and does not preclude the presence or addition of one or more functions, operations, elements, etc. Moreover, it should be understood that the term "include", "have", or the like used in various embodiments of the present disclosure is to indicate the presence of features, numbers, steps, operations, elements, parts, or a combination thereof described in the specifications, and does not preclude the presence or addition of one or more other features, numbers, steps, operations, elements, parts, or a combination thereof.

When an element is referred to as being "connected" to or by any other element, it should be understood that the element may be directly connected by the other element, but another new element may also be interposed between the element and the other element. Contrarily, when an element is referred to as being "directly connected" or "directly accessed" to or by any other element, it should be understood that there is no new another element between the element and the other element.

The terms used in various embodiments of the present disclosure are for the purpose of describing the particular embodiments only and are not intended to limit the various embodiments of the present disclosure. Singular forms may include plural forms unless apparently indicated otherwise contextually.

All of the terms used herein including technical or scientific terms have the same meanings as those generally understood by those of ordinary skill in the art of various embodiments of the present disclosure, unless they are defined other.

The terms defined in a generally used dictionary should be interpreted as having the same meanings as the contextual meanings of the relevant technology and should not be interpreted as having ideal or exaggerated meanings unless they are clearly defined in the various exemplary embodiments of the present disclosure.

The present disclosure relates to a hairpin inspection apparatus for an electrification component in which light is irradiated to a hairpin of the electrification component through a lighting unit including a condensing lens in front of a light source, thereby increasing light efficiency while improving uniformity of light.

The hair inspection apparatus for an electrification component according to an embodiment of the present disclosure is an apparatus for inspecting a hairpin included in the circumferential direction of the electrification component. Hereinafter, embodiments of the present disclosure will be described with reference to the accompanying drawings.

Figure 2:
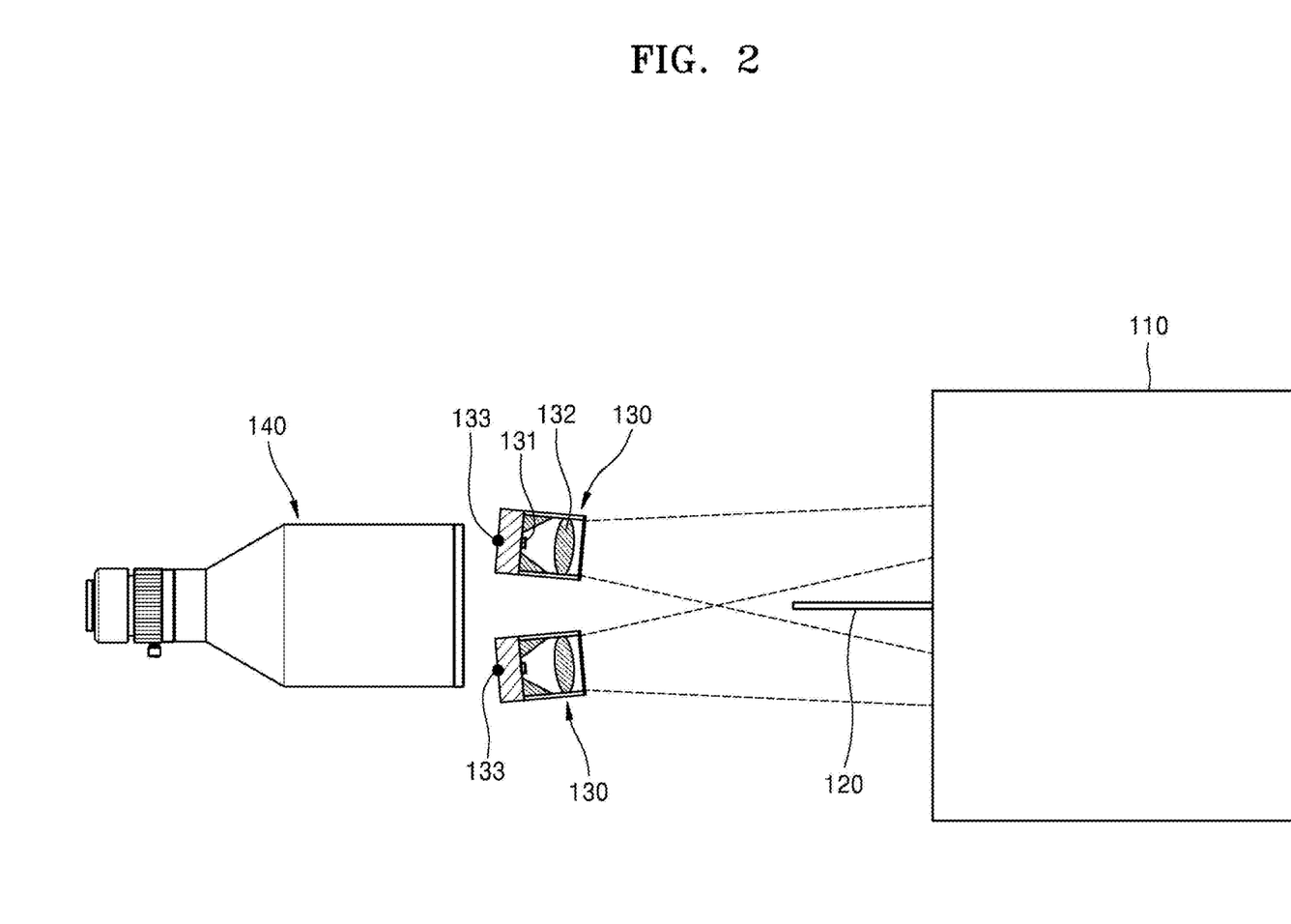
FIG. 2 illustrates a hairpin inspection apparatus for an electrification component, according to an embodiment of the present disclosure.

Referring to FIG. 2, the hairpin inspection apparatus for an electrification component according to an embodiment of the present disclosure may include an electrification block 110, a hairpin 120, and a lighting unit 130.

The electrification block 110 may be seated on a rotating device, and may be rotated by the rotating device. The electrification block 110 may have the hairpin 120 among electrification components thereon, and may be a stator.

The hairpin 120 may be mounted on the electrification block 110. The hairpin 120 may have a pin shape extending in a longitudinal direction and may be provided in the circumferential direction of the electrification block 110.

According to an embodiment of the present disclosure, inspection of the hairpin 120 may be performed while irradiating light to the electrification block 110 and the hairpin 120 through the lighting unit 130 described below and rotating the electrification block 110 through the rotating device.

The lighting unit 130 may be provided on the hairpin 120 to irradiate the light to the electrification block 110 and the hairpin 120. Referring to FIG. 2, the lighting unit 130 may include a light source 131 that generates light and a lens 132 that collects the light generated from the light source 131.

The light source 131 may be a light-emitting diode (LED). However, the light source 131 is not limited to the LED, and may be various types of light sources as long as they are capable of generating light.

The lens 132 may collect the light generated from the light source 131 and may be a condensing lens. The lens 132 may change a path of the light source 131 while collecting the light generated from the light source 131, and as the light generated from the light source 131 is collected through the lens 132, it is possible to prevent light from being diffused according to various angles.

The lens 132 may change light distribution while collecting the light generated from the light source 131, and the lens 132 according to an embodiment of the present disclosure may be various types of lenses as long as they are capable of changing light distribution of the light generated from the light source 131. The lens 132 may also be installed to be replaceable on the lighting unit 130, thereby changing the light distribution of the light generated from the light source 131.

To perform inspection of the hairpin 120 through the hairpin inspection apparatus for an electrification component according to an embodiment of the present disclosure, a brightness difference between the hairpin 120 and the electrification component 110 needs to exist.

More specifically, to obtain an image by photographing the hairpin 120 and the electrification block 110 through a camera, the hairpin 120 and the electrification block 110 need to be distinguished from each other in an image.

To this end, it is necessary to reduce light reflected from the hairpin 120 and incident on the lens of the camera and increase light reflected from the electrification block 110 and incident to the lens of the camera.

However, in the conventional lighting module using the LED 10 and the diffuser 20 as shown in FIG. 1, the amount of light may be sufficient due to diffusion of light and the brightness difference between the hairpin and the electrification block is difficult to induce due to light diffusion at several angles.

The hairpin inspection apparatus for an electrification component according to an embodiment of the present disclosure may obtain collected light by preventing light from being diffused, through the lens 132 provided in the lighting unit 130, thereby causing the hairpin 120 to be dark and the electrification block 110 to be bright.

That is, the hairpin inspection apparatus for an electrification component according to an embodiment of the present disclosure may induce the brightness difference between the hairpin 120 and the electrification block 110 through the lens 132 provided in the lighting unit 130.

The hairpin inspection apparatus for an electrification component according to an embodiment of the present disclosure may adjust a lighting angle of the lighting unit 130 while irradiating collected light by preventing light from being diffused, through the lens 132, thereby causing the hairpin 120 to be dark and the electrification block 110 to be bright.

Figure 3:
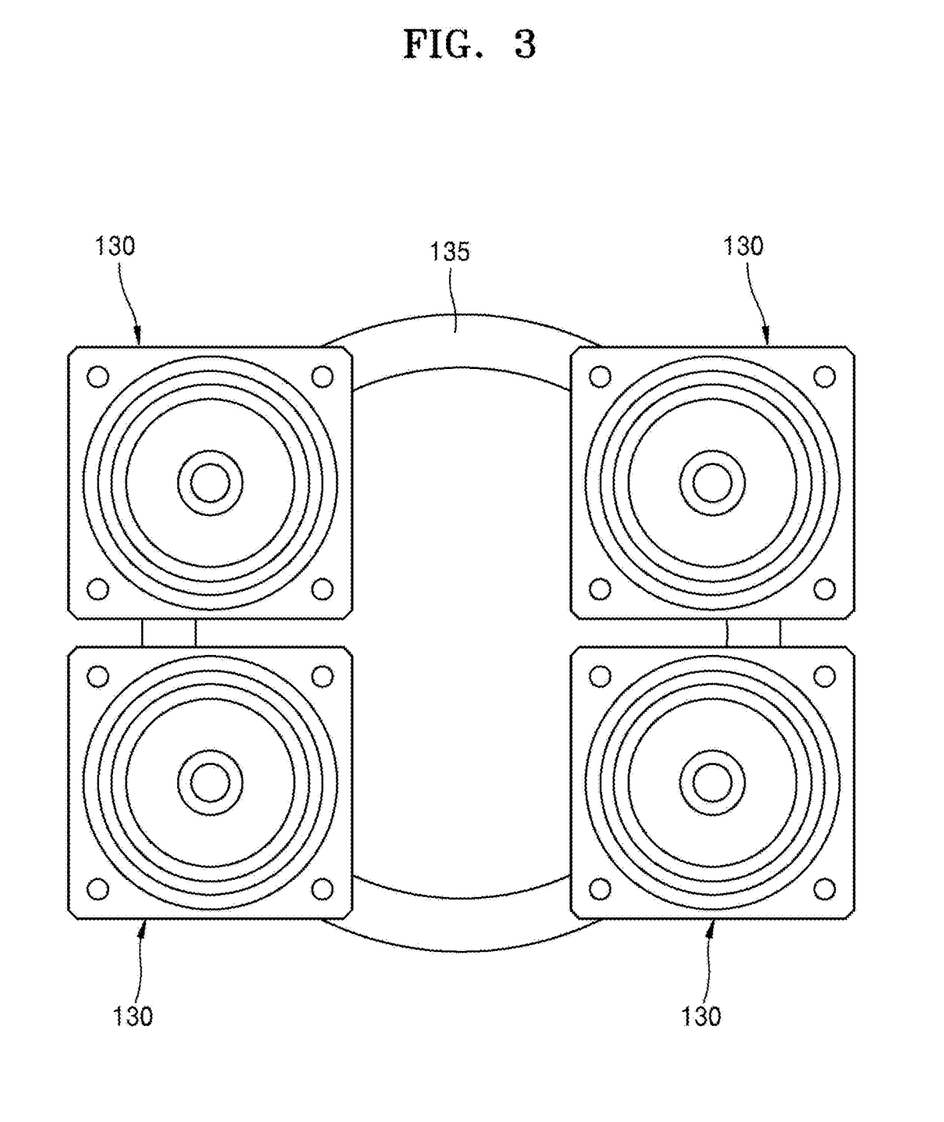
FIG. 3 illustrates a plurality of lighting units included in a hairpin inspection apparatus for an electrification component, according to an embodiment of the present disclosure.

Referring to FIG. 3, there may be a plurality of lighting units 130 that may irradiate light to the electrification block 110 and the hairpin 120 in different directions.

The hairpin inspection apparatus for an electrification component according to an embodiment of the present disclosure may further include an angle adjusting unit 133 that adjusts a direction of the lighting unit 130. Referring to FIGS. 2 and 3, the plurality of lighting units 130 may be coupled to a frame 135, and the direction of the lighting unit 130 may be adjusted by adjusting the angle of the lighting unit 130 with respect to the frame 135 through the angle adjusting unit 133.

By adjusting the direction of the lighting unit 130 through the angle adjusting unit 133, the angle of light irradiated from the lighting unit 130 may be changed. The angle adjusting unit 133 may include a hinge, and may include various components as long as they are capable of adjusting the direction of the lighting unit 130.

The hairpin inspection apparatus for an electrification component according to an embodiment of the present disclosure may further include a controller 150 that controls the direction of the lighting unit 130 by controlling the angle adjusting unit 133.

The controller 150 may control the direction of the lighting unit 130, and uniformity of light irradiated from the plurality of lighting units 130 may be secured through the controller 150.

The controller 150 may analyze illuminance distribution 160 at the time when light is irradiated from the lighting unit 130, and the controller 150 may control the directions of the plurality of lighting units 130 through the illuminance distribution 160.

Figure 4:
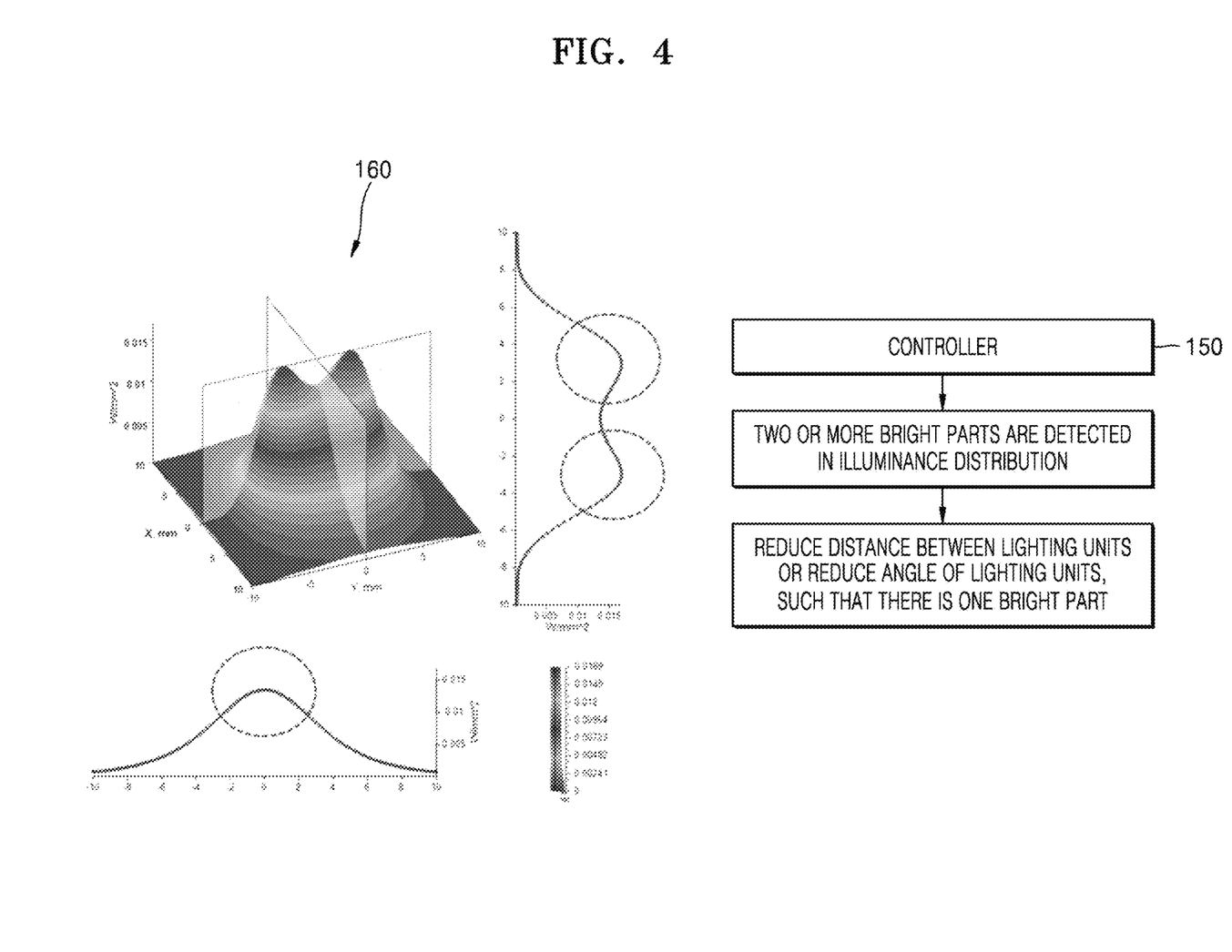
FIGS. 4 and 5 illustrate a method, performed by a controller, of analyzing illuminance distribution, and controlling a direction of a lighting unit according to the illuminance distribution to secure uniformity of illuminance, according to an embodiment of the present disclosure.

More specifically, referring to FIG. 4, when two or more bright parts are detected from the illuminance distribution 160, the controller 150 may control the lighting units 130 by reducing a distance between the plurality of lighting units 130 or reducing an angle between the plurality of lighting units 130 through the angle adjusting unit 133 such that there is one bright part in the illuminance distribution 160.

Figure 5:
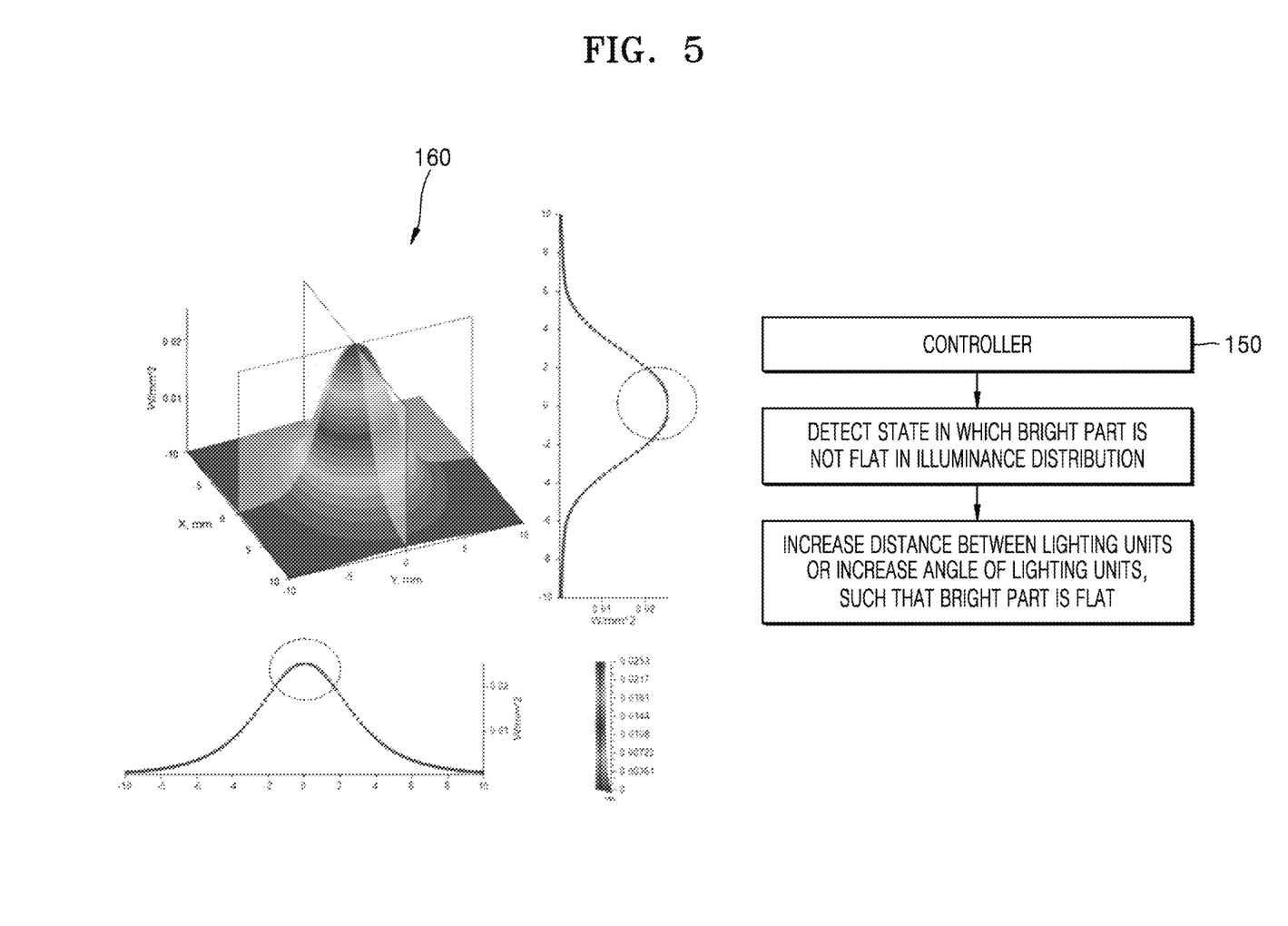

Referring to FIG. 5, when a bright part is convex in the illuminance distribution 160, the controller 150 may control the lighting units 130 by increasing the distance between the plurality of lighting units 130 or increasing the angle between the plurality of lighting units 130 through the angle adjusting unit 133 such that the bright part is flat in the illuminance distribution 160.

Figure 6:
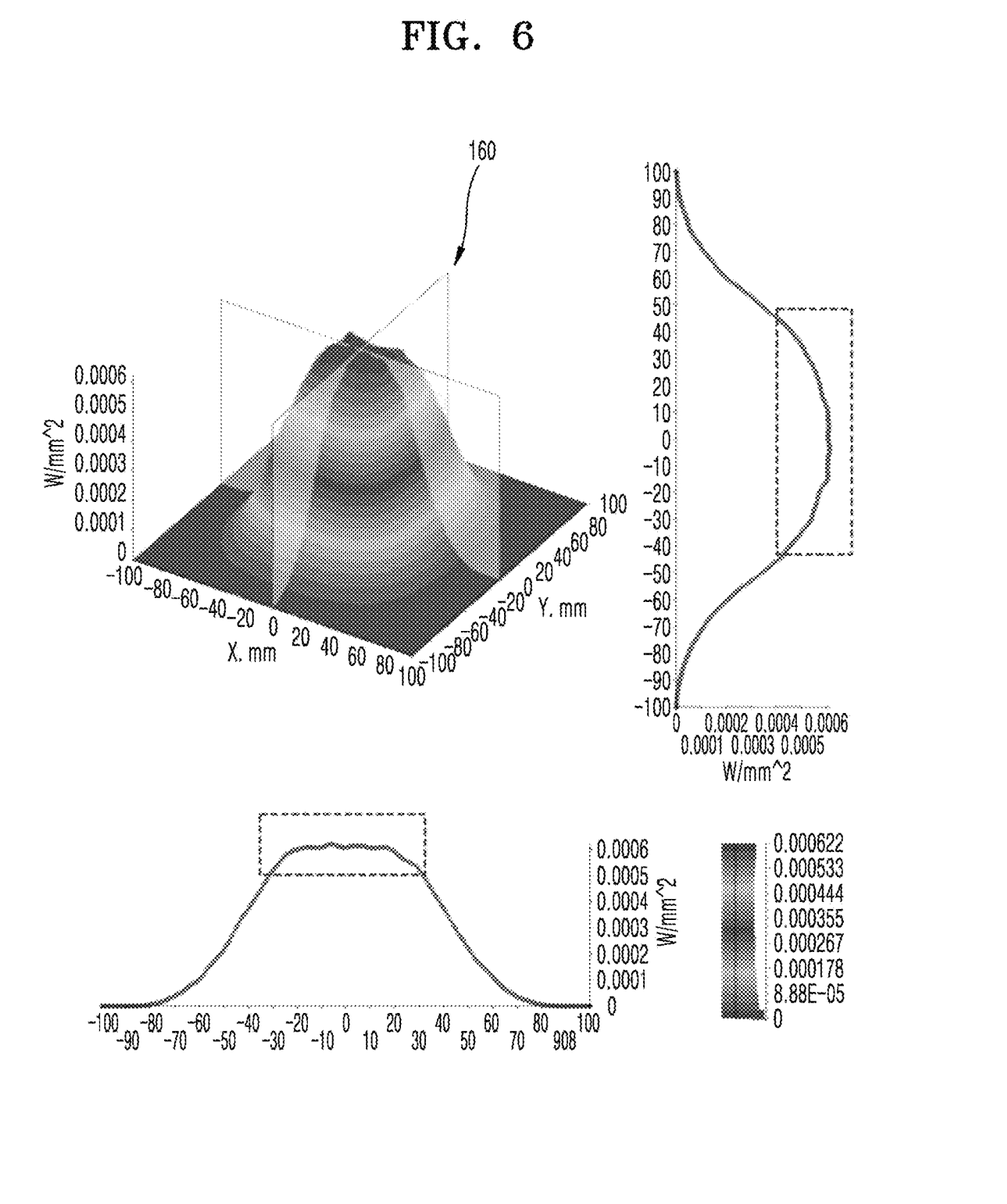
FIG. 6 illustrates that uniformity of illuminance is secured by controlling a direction of a lighting unit through a controller according to an embodiment of the present disclosure.

As such, the controller 150 may adjust the directions of the plurality of lighting units 130 by analyzing the illuminance distribution 160 when the light is irradiated through the lighting unit 130, thereby securing uniformity of light as shown in FIG. 6.

The hairpin inspection apparatus for an electrification component according to an embodiment of the present disclosure may improve uniformity of light irradiated from the plurality of lighting units 130 by controlling the directions of the plurality of lighting units 130, and then adjust the angle of light irradiated from the light source 131 of the lighting unit 130 according to characteristics of light distribution, through the lens 132 provided in the lighting unit 130.

That is, the hairpin inspection apparatus for an electrification component according to an embodiment of the present disclosure may adjust the angle of light irradiated from the light source 131 through the lens 132 while securing uniformity of light through the controller 150.

According to an embodiment of the present disclosure, a slope may be formed at the end of the hairpin 120. As the width of the hairpin 120 becomes narrower toward the end of the hairpin 120, the slope may be formed at the end of the hairpin 120. Specifically, the end of the hairpin 120 may have a sharp shape.

When the slope is formed at the end of the hairpin 120, the brightness difference between the hairpin 120 and the electrification block 110 may be induced. As described above, to inspect the hairpin 120, it is necessary to reduce light incident after reflected from the hairpin 120 and increase light incident after reflected from the electrification block 110.

According to an embodiment of the present disclosure, by forming the slope at the end of the hairpin 120, the light irradiated to the hairpin 120 may be moved to the electrification block 110 along the slope of the hairpin 120. Thus, the light incident after reflected from the hairpin 120 may be reduced, and the light incident after reflected from the electrification block 110 may be increased.

The hairpin inspection apparatus for an electrification component according to an embodiment of the present disclosure may further include a photographing unit 140 provided on the hairpin 120 to photograph the hairpin 120 and the electrification block 110.

Figure 7:
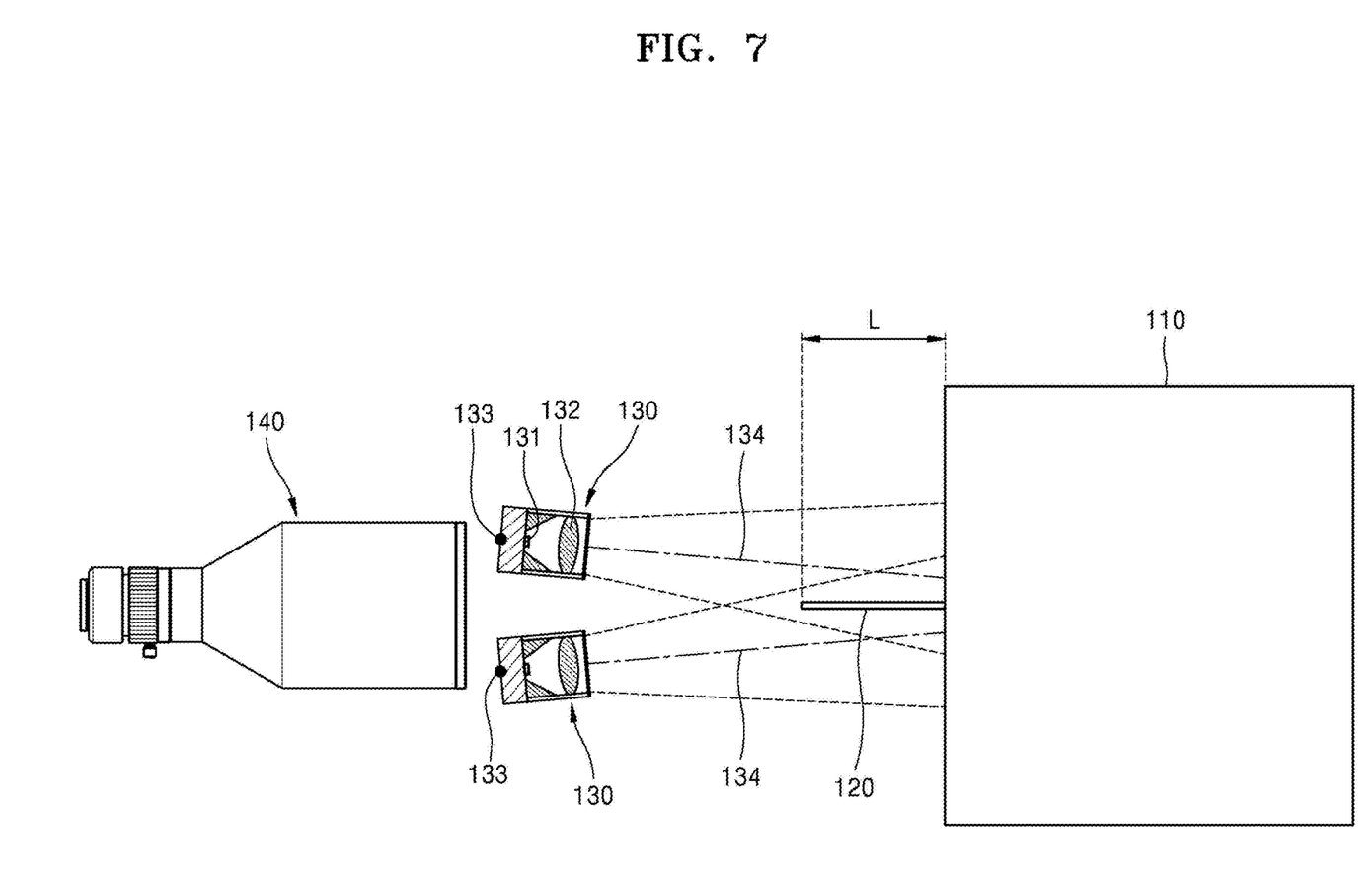
FIG. 7 illustrates that a hairpin is arranged between center lines along which light is irradiated from a plurality of lighting units, according to an embodiment of the present disclosure.

Referring to FIGS. 2 and 7, the photographing unit 140 may include a camera, and inspection of the hairpin 120 may be performed by photographing the hairpin 120 and the electrification block 110 through the photographing unit 140.

According to an embodiment of the present disclosure, the photographing unit 140 may be arranged on an extending line of a center line of the electrification block 110, and the hairpin 120 may be arranged between center lines 134 along which light is irradiated from the plurality of lighting units 130.

By arranging the photographing unit 140 on the extending line of the center line of the electrification block 110 and arranging the hairpin 120 between the center lines 134 along which the light is irradiated from the plurality of lighting units 130 as shown in FIG. 7, the brightness difference between the hairpin 120 and the electrification block 110 may be induced.

As described above, to inspect the hairpin 120, it is necessary to reduce light incident after reflected from the hairpin 120 and increase light incident after reflected from the electrification block 110.

By arranging the photographing unit 140 on the extending line of the center line of the electrification block 110 and arranging the hairpin 120 between the center lines 134 along which the light is irradiated from the plurality of lighting units 130 according to an embodiment of the present disclosure, the amount of light irradiated to the electrification block 110 may be increased when compared to the amount of light irradiated to the hairpin 120. Thus, the light incident after reflected from the hairpin 120 may be reduced, and the light incident after reflected from the electrification block 110 may be increased.

Figure 8:
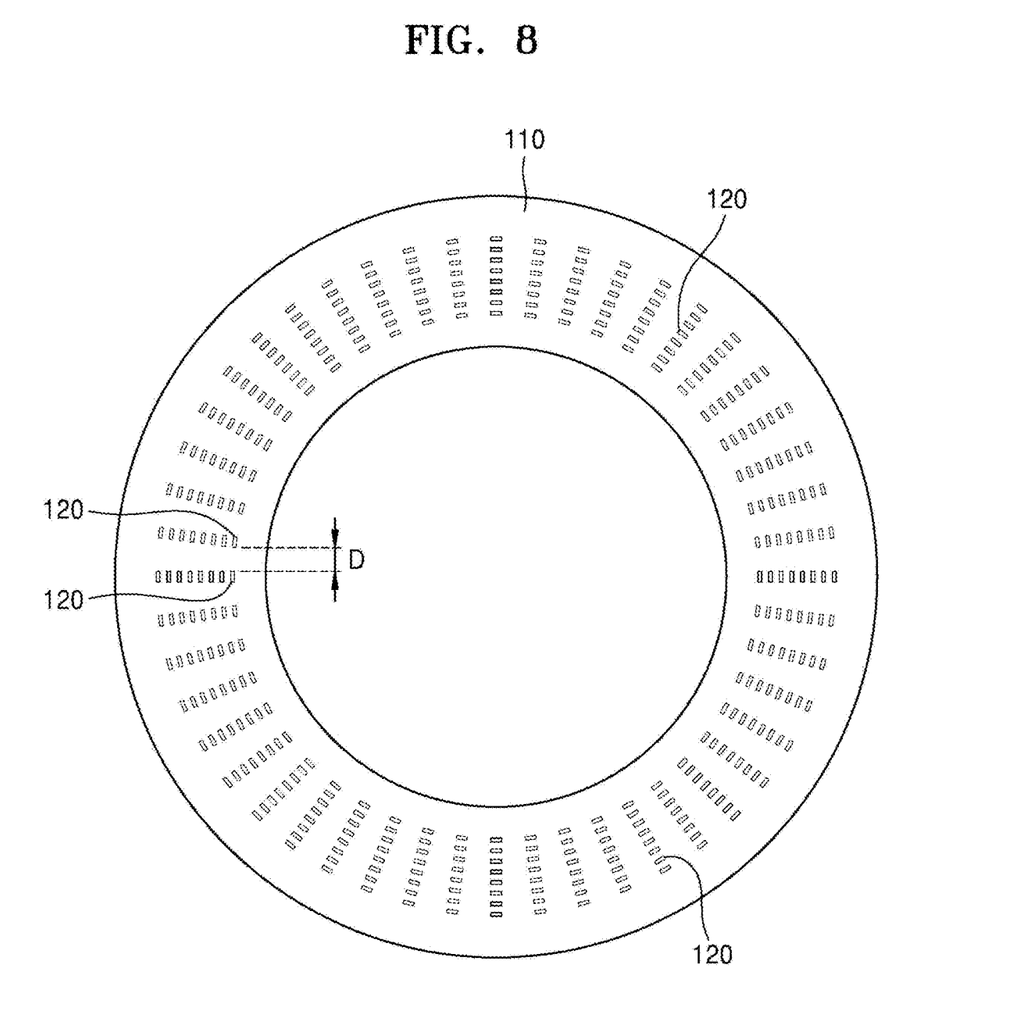
FIG. 8 illustrates that a plurality of hairpins are mounted on an electrification block, according to an embodiment of the present disclosure.

Referring to FIG. 8, a plurality of hairpins 120 may be mounted on the electrification block 110 according to an embodiment of the present disclosure.

When the plurality of hairpins 120 are mounted on the electrification block 110, an angle of light irradiated to the hairpin 120 from the lighting unit 130 may be less than arctan (a distance D between hairpins/a length L of a hairpin).

As described above, by arranging the hairpin 120 between the center lines 134 along which light is irradiated from the plurality of lighting units 130, the amount of light irradiated to the electrification block 110 may be increased when compared to the amount of light irradiated to the hairpin 120.

The hairpin inspection apparatus for an electrification component according to an embodiment of the present disclosure may adjust the angle of the lighting unit 130 to improve uniformity of the light while increasing the amount of the light irradiated to the electrification block 110 when compared to the amount of the light irradiated to the hairpin 120.

As the angle of the lighting unit 130 is adjusted, an angle at which the light is irradiated from the lighting unit 130 to the hairpin 120 may be changed. According to an embodiment of the present disclosure, when the angle of the lighting unit 130 is adjusted, the angle at which the light is irradiated to the hairpin 120 from the lighting unit 130 may be less than arctan (a distance D between hairpins/a length L of a hairpin).

When the angle at which the light is irradiated from the lighting unit 130 to the hairpin 120 is greater than arctan (a distance D between hairpins/a length L of a hairpin), the light irradiated from the lighting unit 130 to the electrification block 110 may have interference with the plurality of hairpins 120.

To perform inspection through the hairpin inspection apparatus for an electrification component according to an embodiment of the present disclosure, the hairpin 120 needs to be dark and the electrification block 110 needs to be bright, and interference of the light irradiated from the electrification block 130 to the electrification block 110 with the plurality of hairpins 120 may have an influence upon the brightness of the electrification block 110.

When the angle at which the light is irradiated from the lighting unit 130 to the hairpin 120 is greater than arctan (a distance D between hairpins/a length L of a hairpin), it may be difficult to arrange the hairpin 120 between the center lines 134 along which the light is irradiated from the plurality of lighting units 130.

Thus, the angle at which the light is irradiated from the lighting unit 130 to the hairpin 120 may be less than arctan (a distance D between hairpins/a length L of a hairpin).

Referring to FIG. 7, the length L of the hairpin 120 may be a length by which the hairpin 120 protrudes from the electrification block 110. Referring to FIG. 8, the distance D between the hairpins 120 may be a distance between the adjacent hairpins 120 when the plurality of hairpins 120 are mounted on the electrification block 110.

More specifically, the plurality of hairpins 120 may be mounted along the circumference of the electrification block having a cylindrical shape, and the distance D between the hairpins 120 may be a distance between adjacent hairpins 120 among the plurality of hairpins 120 mounted along the circumference of the electrification block 110 in the innermost part of the electrification block 110 as shown in FIG. 8.

When the hairpins 120 are mounted along the circumference of the electrification block 110 having a cylindrical shape, the distance between the hairpins 120 may be smallest in the innermost part of the electrification block 110.

Thus, to prevent interference of the plurality of hairpins 120 in the innermost part of the electrification block 110 from having an influence upon the brightness of the electrification block 110, the distance D between the hairpins 120 may be a distance between the adjacent hairpins 120 among the plurality of hairpins 120 mounted along the circumference of the electrification block 110 in the innermost part of the electrification block 110.

Herein, the angle at which the light is irradiated from the lighting unit 130 to the hairpin 120 may be an angle formed by the extending line along which the hairpin 120 protrudes from the electrification block 110 and the center line 134 of the lighting unit 130.

According to an embodiment of the present disclosure, when the length L of the hairpin 120 is 70 mm and the distance D between the hairpins 120 is 6.85 mm, the angle at which the light is irradiated from the lighting unit 130 to the hairpin 120 may be less than arctan (D/L)=acrtan (6.85 mm/70 mm)=0.09755rad=5.58°.

According to an embodiment of the present disclosure, the angle at which the light is irradiated to the hairpin 120 from the lighting unit 130 may be 0 degree, and the angle at which the light is irradiated from the lighting unit 130 to the hairpin 120 may be greater than 0 or less than arctan (a distance D between hairpins/a length L of a hairpin).

Herein, when the angle at which the light is irradiated from the lighting unit 130 to the hairpin 120 is 0, a difference in the amount of light between the hairpin 120 and the electrification block 110 may not occur due to perpendicular irradiation of light to the hairpin 120 and the electrification block 110.

In addition, when the angle at which the light is irradiated from the lighting unit 130 to the hairpin 120 is 0, it is difficult to improve uniformity of light through the plurality of lighting units 130, such that the angle at which the light is irradiated from the lighting unit 130 to the hairpin 120 may be greater than 0.

The hairpin inspection apparatus for an electrification component according to an embodiment of the present disclosure may have effects as below.

The present disclosure provides the hairpin inspection apparatus for an electrification component in which light is irradiated to a hairpin of the electrification component through a lighting unit including a condensing lens in front of a light source, thereby increasing light efficiency while improving uniformity of light.

Moreover, the hairpin inspection apparatus for an electrification component according to an embodiment of the present disclosure may induce a brightness difference between the hairpin and the electrification component by collecting the light through the lighting unit including the condensing lens in front of the light source.

A track time may be inversely proportional to a speed that is inversely proportional to the amount of light of illumination, and for the conventional lighting module, an obtained image may be dark due to a small amount of light, increasing the track time.

However, the hairpin inspection apparatus for an electrification component according to an embodiment of the present disclosure may reduce the track time by increasing the amount of light through the lighting unit including the condensing lens, thereby reducing the track time.

Moreover, the hairpin inspection apparatus for an electrification component according to an embodiment of the present disclosure may increase the efficiency of the amount of light through the lighting unit including the condensing lens in front of the light source, thereby securing a sufficient amount of light without increasing the number of LEDs.

In this way, the hairpin inspection apparatus for an electrification component according to an embodiment of the present disclosure may reduce the size thereof while reducing a cost by reduction of the number of LEDs.

Furthermore, the hairpin inspection apparatus for an electrification component according to an embodiment of the present disclosure may irradiate light to the hairpin and the electrification block of the electrification component through the lighting unit including the condensing lens in front of the light source, and reduce light incident after reflected from the hairpin and increase light incident after reflected from the electrification block by arranging the hairpin between the center lines along which the light is irradiated from the plurality of lighting units.

So far, the present disclosure has been described in detail with preferred embodiments, but the present disclosure is not limited to the above embodiments, and various modifications may be made without departing from the scope of the present disclosure. Accordingly, the true technical scope of the present disclosure should be defined by the technical spirit of the appended claims.

The invention claimed is:

1. A hairpin inspection apparatus for inspecting a hairpin included in an electrification component, the apparatus comprising:
    an electrification block seated on a rotating device and rotated by the rotating device;
    a hairpin mounted on an electrification block; and
    a lighting unit provided on the hairpin to irradiate light to the electrification block and the hairpin,
    wherein the lighting unit comprises a light source generating light, and a lens collecting the light generated from the light source.

2. The hairpin inspection apparatus of claim 1, wherein a slope is formed at an end of the hairpin.

3. The hairpin inspection apparatus of claim 1, wherein the lighting unit is provided in plurality, and a plurality of the lighting units are configured to irradiate light to the electrification block and the hairpin in different directions.

4. The hairpin inspection apparatus of claim 3, further comprising:
    an angle adjusting unit configured to adjust directions of the lighting units; and
    a controller configured to control the directions of the lighting units by controlling the angle adjusting unit.

5. The hairpin inspection apparatus of claim 4, wherein the controller is further configured to:
    analyze illuminance distribution when light is irradiated through the lighting units; and
    when two or more bright parts are detected in the illuminance distribution, control the lighting units while reducing a distance between the plurality of lighting units or reducing an angle between the plurality of lighting units, such that there is one bright part in the illuminance distribution.

6. The hairpin inspection apparatus of claim 5, wherein the controller is further configured to:
    analyze illuminance distribution when light is irradiated through the lighting units; and
    when a bright part is convex in the illuminance distribution, control the lighting units while increasing the distance between the plurality of lighting units or increasing the angle between the plurality of lighting units, such that the bright part is flat in the illuminance distribution.

7. The hairpin inspection apparatus of claim 1, further comprising a photographing unit provided on the hairpin to photograph the hairpin and the electrification block,
    wherein the photographing unit is arranged on an extending line of a center line of the electrification block.

8. The hairpin inspection apparatus of claim 7, wherein the hairpin is arranged between center lines along which light is irradiated from the plurality of lighting units.

9. The hairpin inspection apparatus of claim 1, wherein the plurality of hairpins are mounted on the electrification block, and an angle at which the light is irradiated from the lighting unit to the hairpin is less than arctan (a distance D between hairpins/a length L of a hairpin).

* * * * *